US010078620B2

(12) United States Patent
Farabet et al.

(10) Patent No.: US 10,078,620 B2
(45) Date of Patent: Sep. 18, 2018

(54) RUNTIME RECONFIGURABLE DATAFLOW PROCESSOR WITH MULTI-PORT MEMORY ACCESS MODULE

(75) Inventors: Clément Farabet, Brooklyn, NY (US); Yann LeCun, New York, NY (US)

(73) Assignee: NEW YORK UNIVERSITY, New York, NY (US)

( * ) Notice: Subject to any disclaimer, the term of this patent is extended or adjusted under 35 U.S.C. 154(b) by 1206 days.

(21) Appl. No.: 13/479,742

(22) Filed: May 24, 2012

(65) Prior Publication Data

US 2012/0303932 A1 Nov. 29, 2012

Related U.S. Application Data

(60) Provisional application No. 61/490,942, filed on May 27, 2011.

(51) Int. Cl.
*G06F 15/78* (2006.01)
*G06N 3/04* (2006.01)
*G06N 3/10* (2006.01)

(52) U.S. Cl.
CPC ....... *G06F 15/7867* (2013.01); *G06N 3/0454* (2013.01); *G06N 3/10* (2013.01); *Y02D 10/12* (2018.01); *Y02D 10/13* (2018.01)

(58) Field of Classification Search
None
See application file for complete search history.

(56) References Cited

U.S. PATENT DOCUMENTS

| 5,892,962 | A | * | 4/1999 | Cloutier | 712/16 |
| 7,743,085 | B2 | * | 6/2010 | Schmit et al. | 708/710 |
| 7,743,236 | B2 | * | 6/2010 | Saito et al. | 712/227 |
| 7,882,307 | B1 | * | 2/2011 | Wentzlaff et al. | 711/119 |
| 9,213,677 | B2 | * | 12/2015 | Konig | G06F 15/8007 |
| 2006/0233006 | A1 | * | 10/2006 | Fant | 365/1 |
| 2010/0199069 | A1 | * | 8/2010 | Kim et al. | 712/30 |
| 2011/0264888 | A1 | * | 10/2011 | Dasu | G06F 15/7867 712/15 |

(Continued)

OTHER PUBLICATIONS

Kim et al., "A Highly Scalable Restricted Boltzmann Machine FPGA Implementation", 2009 IEEE, 978-1-4244-3892-1/9, 2009, Stanford, CA, 6 pgs.

(Continued)

*Primary Examiner* — Jacob A Petranek
(74) *Attorney, Agent, or Firm* — Foley & Lardner LLP (57) ABSTRACT

A processor includes a plurality of processing tiles, wherein each tile is configured at runtime to perforin a configurable operation. A first subset of tiles are configured to perform in a pipeline a first plurality of configurable operations in parallel. A second subset of tiles are configured to perform a second plurality of configurable operations in parallel with the first plurality of configurable operations. The process also includes a multi-port memory access module operably connected to the plurality of tiles via a data bus configured to control access to a memory and to provide data to two or more processing tiles simultaneously. The processor also includes a controller operably connected to the plurality of tiles and the multi-port memory access module via a runtime bus. The processor configures the tiles and the multi-port memory access module to execute a computation.

24 Claims, 5 Drawing Sheets

(56) References Cited

U.S. PATENT DOCUMENTS

2012/0102496 A1* 4/2012 Ahn et al. .................... 718/102

OTHER PUBLICATIONS

Kim et al., "A 201.4 GOPS 496 mW Real-Time Multi-Object Recognition Processor with Bio-Inspired Neural Perception Engine", IEEE Journal of Solid-State Circuits, vol. 45, No. 1, Jan. 2010, 14 pgs.

Kung, H.T. "Why Systolic Architectures?", 1982 IEEE, 0018-9162/82/0100-0037; Jan. 1982 10 pgs.

Lowe "Distinctive Image Features from Scale-Invariant Keypoints", International Journal of Computer Vision 60(2), 91-110, Jan. 22, 2004, 20 pgs.

Mutch et al. "Multiclass Object Recognition with Sparse, Localized Features", CVPR 2006 Proceedings of the 2006 IEEE Computer Society Conference on Computer Vision and Pattern Recognition—vol. 1, pp. 11-18, 8 pgs.

Pinto et al., "Why is Real-World Visual Object Recognition Hard?", PLoS Computational Biology, www.ploscompbiol.org, Jan. 2008, vol. 4, Issue 1, 6 pgs.

Russell et al., "LabelMe: a Database and Web-Based Tool for Image Annotation", International Journal of Computer Vision, vol. 77, Issue 1-3, pp. 157-173, May 2008, 32 pgs.

Coates et al., "Scalable Learning for Object Detection with GPU Hardware", International Conference on Intelligent Robots and Systems, 2009, IEEE/RSJ , Oct. 2009; 7 Pgs.

Dennis et al., "A Preliminary Architecture for a Basic Data-Flow Processor", Massachusetts Institute of Technology, ISCA '75 proceedings of the second annual symposium on computer architecture, pp. 126-132, 1975; 7 pgs.

Dennis, "Stream Data Types for Signal Processing", Massachusetts Institute of Technology, Computation Structures Group Memo 362, Oct. 27, 1994, 21 pgs.

Ahmed et al., "Training Hierarchical Feed-Forward Visual Recognition Models Using Transfer Learning from Pseudo-Tasks", Springer-Verlag Berlin Heidelberg 2008, ECCV 2008, Part III 5304, pp. 69-82 14 pgs.

Bengio et al., "Greedy Layer-Wise Training of Deep Networks", Technical Report 1282, Département d'Informatique et Recherche Opérationnelle, Aug. 21, 2006; 17 pg.s.

Berg et al., "Shape Matching and Object Recognition using Low Distortion Correspondence", U.C. Berkley, UCB//CSD-04-1366, Dec. 6, 2004, 11 pgs.

Chellapilla et al., "Optimally Combining a Cascade of Classifiers", Microsoft Research, http://www.shilman.net/papers/chellapilla_cascade_drr06.pdf ; Oct. 2006; 8 pgs.

Delakis et al., "Text Detection with Convolutional Neural Networks", VISAPP 2008—International Conference on Computer Vision Theory and Application, pp. 290-294; 5 pgs.

Fukushima "Neocognitron: A Hierarchical Neural Network Capable of Visual Pattern Recognition", Neural Networks, vol. 1, pp. 119-130, 1988, 12 pgs.

Garcia et al., "Convolutional Face Finder: A Neural Architecture for Fast and Robust Face Detection", IEEE Transactions on Pattern Analysis and Machine Intelligence, vol. 26, No. 11, Nov. 2004, pp. 1408-1423; 16 pgs.

Farabet et al., "Machine Learning on Very Large Data Sets", chapter from textbook Textbook, 2011 33 pgs.

Hinton et al., "Reducing the Dimensionality of Data with Neural Networks", Science, 313, 504 (2006), 5 pgs.

Huang et al., "Large-Scale Learning with SVM and Convolutional Nets for Generic Object Categorization", Proceedings of the 2006 IEEE Computer Society Conference on Computer Vision and Pattern Recognition (CVPR '06), 8 pgs.

Jain et al., "Natural Image Denoising with Convolutional Networks", advances in neural information processing systems 21, (2008) pp. 769-776; 8 pgs.

Jarrett et al., What is the Best Multi-State Architecture for Object Recognition?, The Courant Institute of Mathematical Sciences, IEEE 12 International Conference on Computer Vision, 2009; 8 pgs.

Kavukcuoglu et al., "Fast Inference in Sparse Coding Algorithms with Applications to Object Recognition", Computational and Biological Learning Laboratory Technical report, CBLL-TR-2008-12-01, Courant Institute of Mathematical Sciences, Dec. 4, 2008, 9 pgs.

LeCun et al., "Backpropagation Applied to Handwritten Zip Code Recognition" Neural Computation 1,541-551 (1989), 1989 Massachusetts Institute of Technology, 11 pgs.

LeCun et al., "Efficient BackPop", Neural Networks: tricks of the trade, Springer, 1998, 44 pgs.

Lee et al., "Static Scheduling of Synchronous Data Flow Programs for Digital Signal Processing", IEEE Transactions on Computers, vol. C-36, No. 1, Jan. 1987, 12 pgs.

Lee et al., "Convolutional Deep Belief Networks for Scalable Unsupervised Learning of Hierarchical Representations", proceedings of the 26th international conference on machine learning, Montréal Canada, 2009, 8 pgs.

Lowe, "Distinctive Image Features from Scale—Invariant Keypoints", International Journal of Computer Vision 60(2), 91-110, 2004, 20 pgs.

Lyu et al., "Nonlinear Image Representation Using Divisive Normalization", IEEE Conference on Computer Vision and Pattern Recognition, Jun. 24-26, 2008, 8 pgs.

Nasse et al., "Face Detection Using GPU-Based Convolutional Neural Networks", CAIP 2009, LNCS 5702, pp. 83-90, 2009, Springer-Verlag Berlin Heidelberg 2009, 8 pgs.

Olshausen et al., "Sparse Coding with an Overcomplete Basis Set: A Strategy Employed by V1?", Vision Res. vol. 37, No. 23, p. 3311-3325, 1997, Elsevier Science Ltd., 15 pgs.

Osadchy et al., Synergistic Face Detection and Pose Estimation with Energy-Based Models, Journal of Machine Learning Research 8 (2007) 1197-1215, May 2007 19 pgs.

Pinto et al., "Why is Real-World Visual Object Recognition Hard?" PLoS Computational Biology / www.ploscompbiol.org, Jan. 2008, vol. 4, Issued 1, 6 pgs.

Simard et al., "Best Practices for Convolutional Neural Networks Applied to Visual Document Analysis", Proceedings of the Seventh International Conference on Document Analysis and Recognition (ICDAR 2003) 6 pgs.

Vaillant et al., "Original approach for the localization of objects in images", IEE Proc. Vis. Image Signal Process, vol. 141, No. 4, Aug. 1994, 6 pgs.

Weston et al., "Deep Learning via Semi-Supervised Embedding", NEC Labs America, Proceedings of the 25th International Conference on Machine Learning, Helsinki, Finland, 2008, and him IGAR, University of Lausanne, 8 pgs.

Bottou et al., "Lush" Reference Manual, Feb. 10, 2011, 681 pgs.

LeCun et al. "Convolutional Networks Applications and Vision," data.clement.farabet.net/pubs/iscas10b.pdf ; May 2010, 4 pgs.

Cho et al., "Diastolic Arrays: Throughput-Driven Reconfigurable Computing", Massachusetts Institute of Technology, National Taiwan University, Cornell University, people.csail.mit.edu/devadas/pubs/diastolic_array.pdf ; 2008, 8 pgs.

Corda, "Building Heterogeneous Platforms for Online Learning with Dataflow Computing Design," data.clement.farabet.net/pubs/lccc10-poster.pdf; poster; Dec. 2010, 1 pg.

Farabet et al., "Hardware Accelerated Convolutional Neural Networks for Synthetic Vision Systems", data.neuflow.org/pubs/iscas10a.pdf ; Yale University, May 2010, 4 pgs.

Farabet et al., "CNP: An FPGA-Based Processor for Convolutional Networks", yann.lecun.com/exdb/publis/pdf/farabet-fpl-09.pdf; Sep. 2009, 6 pgs.

Grangier et al., "Deep Convolutional Networks for Scene Parsing", NEC Labs America, citeseerx.ist.psu.edu/viewdoc/download?doi=10.1.1.183 . . . ; Jun. 2009, 2 pgs.

Hadsell et al, "Learning Long-Range Vision for Autonomous Off-Road Driving", Courant Institute of Mathematical Sciences and Net-Sale Technologies, yann.lecun.com/exdb/publis/pdf/hadsell-jfr-09.pdf; 2009, 31 pgs.

(56) References Cited

OTHER PUBLICATIONS

Kavukcuoglu et al., "Learning Invariant Features through Topographic Filter Maps", Courant Institute of Mathematical Sciences, yann.lecun.com/exdb/publis/pdf/koray-cypr-09.pdf ; 2009, 8 pgs.

LeCun et al., "Gradient-Based Learning Applied to Document Recognition", yann.lecun.com/exdb/publis/pdf/lecun-01a.pdf; 46 pgs., Jun. 1998.

LeCun et al., "Handwritten Digit Recognition with a Back-Propagation Network", AT&T Laboratories, yann.lecun.com/exdb/publis/pdf/lecun-90c.pdf; 1990, 12 pgs.

LeCun et al., "Learning Methods for Generic Object Recognition with Invariance to Pose and Lighting", yann.lecun.com/exdb/publis/pdf/lecun-04.pdf; 2004, 8 pgs.

Nowlan et al., "A Convolutional Neural Network Hand Tracker", reference.kfupm.edu.sa/.../a_convolutional_neural_network_hand_tr . . . ; 1995, 8 pgs.

Ranzato et al., "Unsupervised Learning of Invariant Feature Hierarchies with Applications to Object Recognition", www.cs.nyu.edu/~ylan/files/publi/ranzato-cypr-07.pdf ; 2007, 9 pgs.

Chakradhar et al., "A Dynamically Configurable Coprocessor for Convolutional Neural Networks", ISCA '10, Proceedings of the 37th Annual International Symposium on Computer Architechture, Jun. 19, 2010, pp. 247-257, 11 pgs.

Farabet et al., "NeuFlow: A Runtime Reconfigurable Dataflow Processor for Vision", Yale University, yann.lecun.com/exdb/publis/pdf/farabet-ecvw-11.pdf ; Jun. 20-25, 2011, 8 pgs.

Farabet, Clement, "Dataflow Computing for General-Purpose Vision," data.clement.farabet.net/pubs/elab10-keynote.pdf; keynote presentation, Oct. 2010, 30 pages.

\* cited by examiner

RUNTIME RECONFIGURABLE DATAFLOW PROCESSOR WITH MULTI-PORT MEMORY ACCESS MODULE

CROSS REFERENCE TO RELATED APPLICATION

This application claims priority to U.S. Provisional Patent Application No. 61/490,942, filed May 27, 2011 and is herein incorporated by reference in its entirety.

BACKGROUND

Micro-robots, unmanned aerial vehicles (UAVs), imaging sensor networks, wireless phones, and other embedded vision systems all require low cost and high-speed implementations of synthetic vision systems capable of recognizing and categorizing objects in a scene.

Computer vision is the task of extracting high-level information from raw images. A goal of generic or general-purpose synthetic vision systems includes the elaboration of a model that captures the relationships between high dimensional data (images, videos) into a low-dimensional decision space, where arbitrary information can be retrieved easily, e.g. with simple linear classifiers or nearest neighbor techniques. The exploration of such models has been an active field of research for the past decade, ranging from fully trainable models—such as convolutional networks—to hand-tuned models—HMAX-type architectures, as well as systems based on dense SIFT (Scale-Invariant Feature Transform) or HoG (Histograms of Gradients).

Many successful object recognition systems use dense features extracted on regularly-spaced patches over the input image. The majority of the feature extraction systems have a common structure composed of a filter bank (generally based on oriented edge detectors or 2D gabor functions), a non-linear operation (quantization, winner-take-all, sparsification, normalization, and/or point-wise saturation) and finally a pooling operation (max, average or histogramming). For example, the scale-invariant feature transforms operator-applied oriented edge filters to a small patch and determines the dominant orientation through a winner-take-all operation. Finally, the resulting sparse vectors are added (pooled) over a larger patch to form local orientation histograms. Some recognition systems use a single stage of feature extractors. Other models, like HMAX-type models and convolutional networks, use two or more layers of successive feature extractors.

Graphics Processing Units (GPUs) are specialized chips designed to process image data. GPUs are becoming a common alternative to custom hardware in vision applications. Their advantages over custom hardware are numerous: they are inexpensive, available in most recent computers, and easily programmable with standard development kits. However, development of custom hardware solutions, however, continues. Reasons for continued development of custom hardware architectures include performance and power consumption considerations. Development of custom architectures can improve performance and power consumption compared to the performance of general CPUs and GPUs.

SUMMARY

An illustrated processor includes a plurality of processing tiles, wherein each processing tile is configured at runtime to perform a configurable operation. A first subset of processing tiles are configured to perform in a pipeline a first plurality of configurable operations in parallel. A second subset of processing tiles are configured to perform a second plurality of configurable operations in parallel with the first plurality of configurable operations. The process also includes a multi-port memory access module operably connected to the plurality of processing tiles via a data bus configured to control access to a memory and to provide data to two or more processing tiles simultaneously. The processor also includes a controller operably connected to the plurality of processing tiles and the multi-port memory access module via a runtime bus. The processor is configured to configure the plurality of the processing tiles and the multi-port memory access module to execute a computation.

Another illustrated processor includes a plurality of processing tiles, wherein each processing tile is configured to perform an operation and a multi-port memory access module operably connected to the plurality of processing tiles via a data bus configured to control access to a memory. The processor also includes a controller operably connected to the plurality of processing tiles and the multi-port memory access module via a runtime bus. The processor is configured to configure the plurality of the processing tiles and the multi-port memory access module to execute a computation.

An illustrative process includes sending, from a controller, a first configuration packet to one or more processing tiles. The first configuration packet is received at the one or more processing tiles. The process further includes selecting, at the one or more processing tiles, an operation to execute based upon the received first configuration packet. The illustrative process also includes sending, from the controller, a second configuration packet to a multi-port memory access module and connecting a subset of the one or more processing tiles to the multi-port memory access module based upon the second configuration packet.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Described herein are various runtime reconfigurable dataflow processors. Dataflow processors can be used for a variety of data processing tasks, such as, but not limited to, signal processing applications where streams of data are processed and combined. Examples of signal processing applications include image processing, video processing, audio processing, sonar processing, radar processing, etc. The dataflow processor can also be used to process streams of data such as financial data, news feeds, data from multiple sensors, DNA sequences, etc. For example, data from various sensors of a radio-telescope or a particle collider can be processed by a dataflow processor. The dataflow processors can also be used for any computational tasks such as artificial intelligence, machine learning, neural networks, data manipulation, etc. For example, dataflow processors can be used to implement various computer vision algorithms such as object detection, object labeling, object disambiguation, etc. While not limited to implementing image processing algorithms, describing how an image processing algorithm can be implemented on an illustrative dataflow processor highlights a number of features of the dataflow processor.

Figure 4:
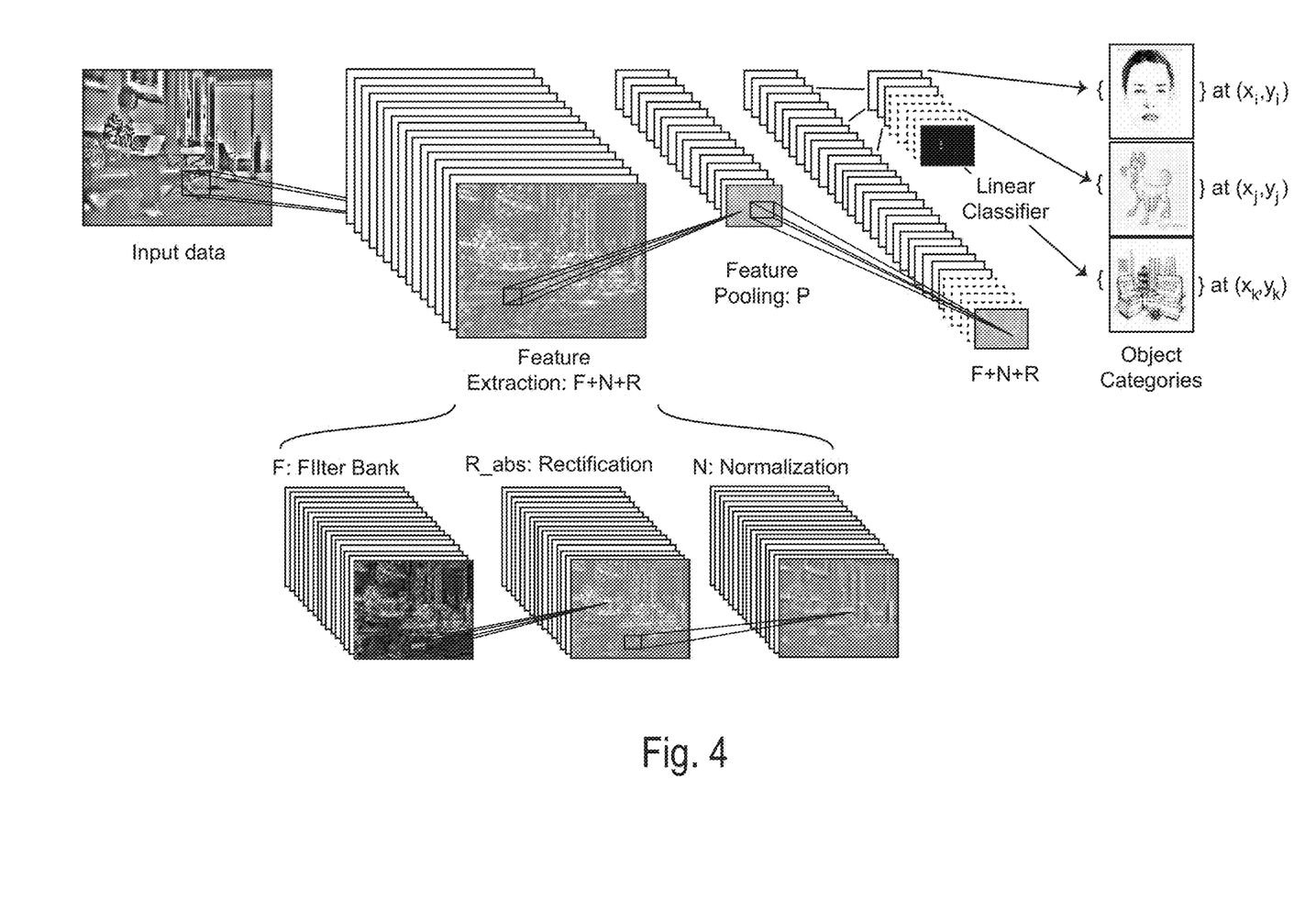
FIG. 4 illustrates a convolutional network for image processing that can be implemented on a dataflow processor in accordance with an illustrative embodiment.

Hierarchical visual models, and more generally image processing algorithms are usually expressed as sequences, trees or graphs of transformations. They can be well described by a modular approach, in which each module processes an input image or video collection and produces a new collection. FIG. 4 illustrates a convolutional network for image processing that can be implemented on a dataflow processor in accordance with an illustrative embodiment and is a graphical illustration of this approach. Each module requires the previous bank to be fully (or at least partially) available before computing its output. This causality prevents simple parallelism to be implemented across modules. However parallelism can easily be introduced within a module, and at several levels, depending on the kind of underlying operations.

Figure 1:
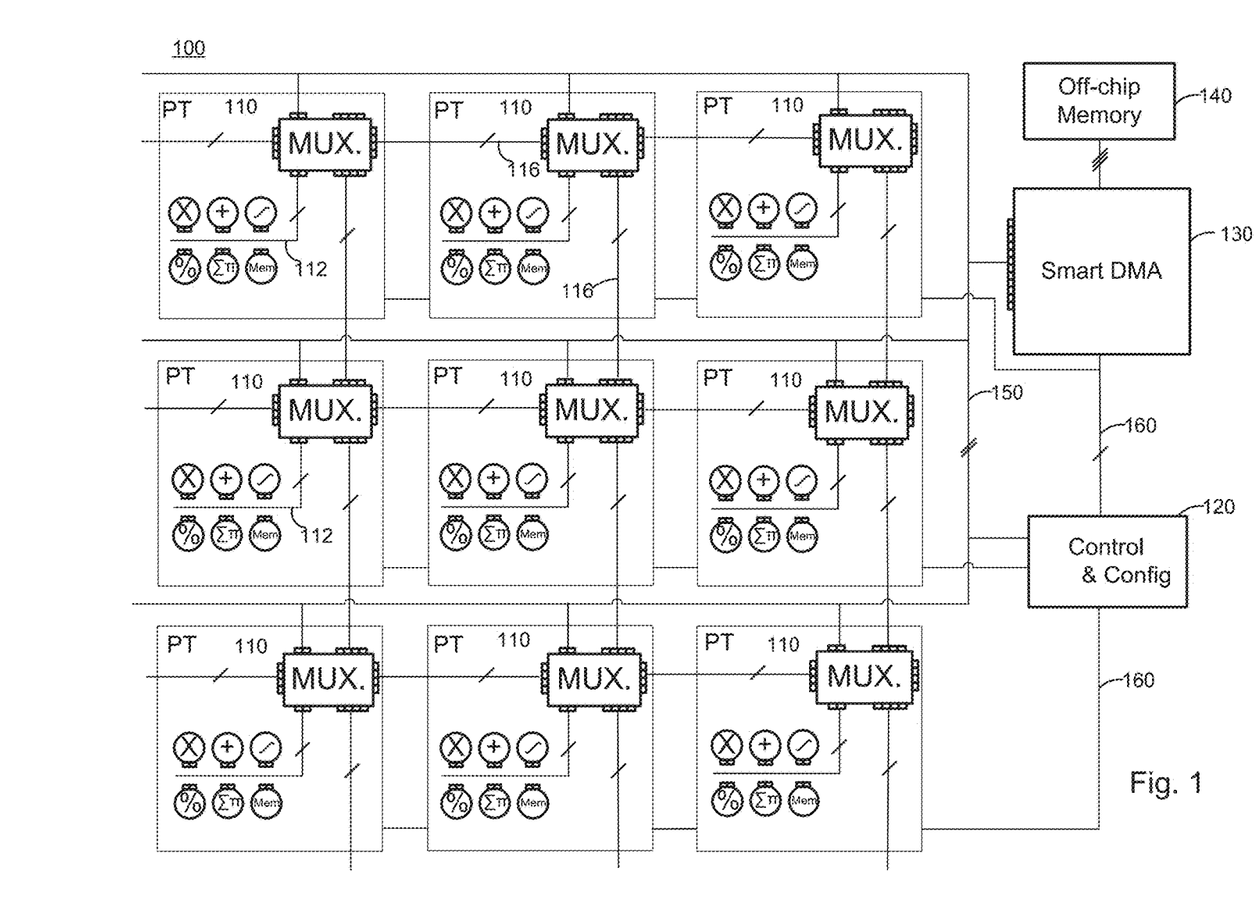
FIG. 1 illustrates a dataflow architecture in accordance with an illustrative embodiment.

FIG. 1 illustrates a dataflow architecture in accordance with an illustrative embodiment. The dataflow architecture can process homogeneous streams of data in parallel. A dataflow processor 100 includes numerous processing tiles 110, a controller or control unit 120, and a memory access module 130, the processing tiles 110 can be formed in various configurations such as, but not limited to, a two-dimensional grid, a two-dimensional oval, a rectangular prism, etc. In one embodiment, the memory access module 130 provides direct memory access to the modules of the dataflow processor 100. The memory access module 130 provides the dataflow processor 100 access to memory 140, which can include off-chip memory and/or external memory. Each of the processing tiles (PTs) can include a bank of processing operators. An operator can be anything from a First-in-First-Out (FIFO) to an arithmetic operator, or even a combination of arithmetic operators. Each processing tile can also include a routing multiplexer (MUX) 114. The MUX 114 can receive and send data from various components of the dataflow processor 100 together. For instance, the MUX 114 can receive data from or send data to the memory access module 130, via the global data lines 150, the operators, via internal data lines 112, or from other processing tiles, via external data lines 116. In one embodiment, the MUX connects a processing tile to four neighbors via the external data lines 116. The dataflow processor 100 can be configured into various data grids. A dataflow grid or grid is a particular configuration of a dataflow processor 100 and includes the configurations of the processing tiles 110, the configuration of the memory access module 130, the active or selected routes between the processing tiles 110 and the memory access module 130, and the active or selected routes between the various processing tiles 110.

The memory access module 130 interfaces memory external to the dataflow processor 100 such as off-chip memory. The memory access module can also provide asynchronous data transfers, with priority management. The memory access module 130 is connected to the processing tiles 110 using the global data lines 150. Each data line can connect a multitude of processing tiles. The number of global data lines can, therefore, be substantially less than the number of processing tiles in a dataflow processor 100. Individual processing tiles can also be connected to other processing tiles using the external data lines 116. In one embodiment, external data lines 116 are used to connect each processing tile to four neighboring processing tiles.

The dataflow processor 100 also includes a runtime configuration bus 160 that can reconfigure many aspects of the processing tiles 110 and the memory access module 130 at runtime. Configurable aspects include, but are not limited to, connections, operators, and memory access module modes. Configurable elements are depicted as squares in FIG. 1. The runtime configuration bus 160 is operably connected to the memory access module 130 and to each of the processing tiles 110. The controller 120 uses the runtime configuration bus 160 to reconfigure the processing tiles 110 and the memory access module 130 at runtime, as opposed to static, offline synthesis.

The dataflow processor 100 can be configured to process image data. In some visual algorithms, operations performed on images are replicated over both dimensions of an image. The number of similar computations in these visual algorithms is typically much larger than the typical latencies of a pipelined processing unit. Accordingly, high throughput can be a top priority in some configurations. In these configurations, low latency is not a top priority. Each operator of the processing tiles has to provide maximal throughput. In one illustrative embodiment, the processing tiles are configured such that one operation can be completed per clock cycle. The dataflow processor 100 can also handle discontinuities in data streams. Processing tiles can be stalled to handle any discontinuities in data streams.

The dataflow processor 100 can be reconfigured at runtime. The time to reconfigure the dataflow processor 100 is in the order of the latency of the dataflow processor 100. This allows the dataflow processor to be reconfigured between two kinds of operations, where the time to reconfigure the dataflow processor is negligible compared to the time needed to perform one such operation.

The dataflow processor 100 provides a flexible processing framework, due to the stallable nature of the operators. Indeed, any path can be configured between the various processing tiles 110, even paths that require more bandwidth than is actually feasible. Instead of breaking, each operator will stall its pipeline when required. This is achieved by the use of FIFOs at the input and output of each operator, which compensates for bubbles in the data streams, and forces the operators to stall when they are full. Any sequence of operators can then be easily created, without concern for bandwidth issues.

The runtime configuration bus 160 allows the dataflow processor 100 to be configured at runtime. In one embodiment, each module in the design, such as the processing tiles and the memory access module, has a set of configurable parameters, routes or settings (depicted as squares on FIG. 1), and possesses a unique address on the network. Groups of similar modules can also share a broadcast address, which dramatically speeds up reconfiguration of elements that need to perform similar tasks. As a non-limiting example, the controller 120 can broadcast a configuration packet to a group of processing tiles, that cause the group of processing tiles to be configured in a similar way. In one embodiment, the runtime configuration bus 160 includes a network, with each of the modules being uniquely addressable. In this embodiment, the controller 120 can address a configuration packet to a single component or can broadcast a configuration packet to a group of modules of the dataflow processor 100.

One embodiment of a typical execution of a computation on this system is the following: (1) the control unit configures each tile to be used for the computation and each connection between the tiles and their neighbors and/or the global lines, by sending a configuration command to each of them, via the runtime configuration bus, (2) it configures the memory access module to prefetch the data to be processed and to be ready to write results back to off-chip memory, (3) when the data is ready, it triggers the streaming out of the data, (4) each tile processes its respective incoming streaming data and passes the results to another tile or back to the memory access module, (5) the control unit is notified of the end of operations when the memory access module has completed.

The dataflow processor 100 can be used to perform arbitrary computations on streams of data, from plain unary operations to complex nested operations. As stated above, operators can be easily cascaded and connected across tiles, independently managing their flow by the use of input/output FIFOs.

Figure 2:
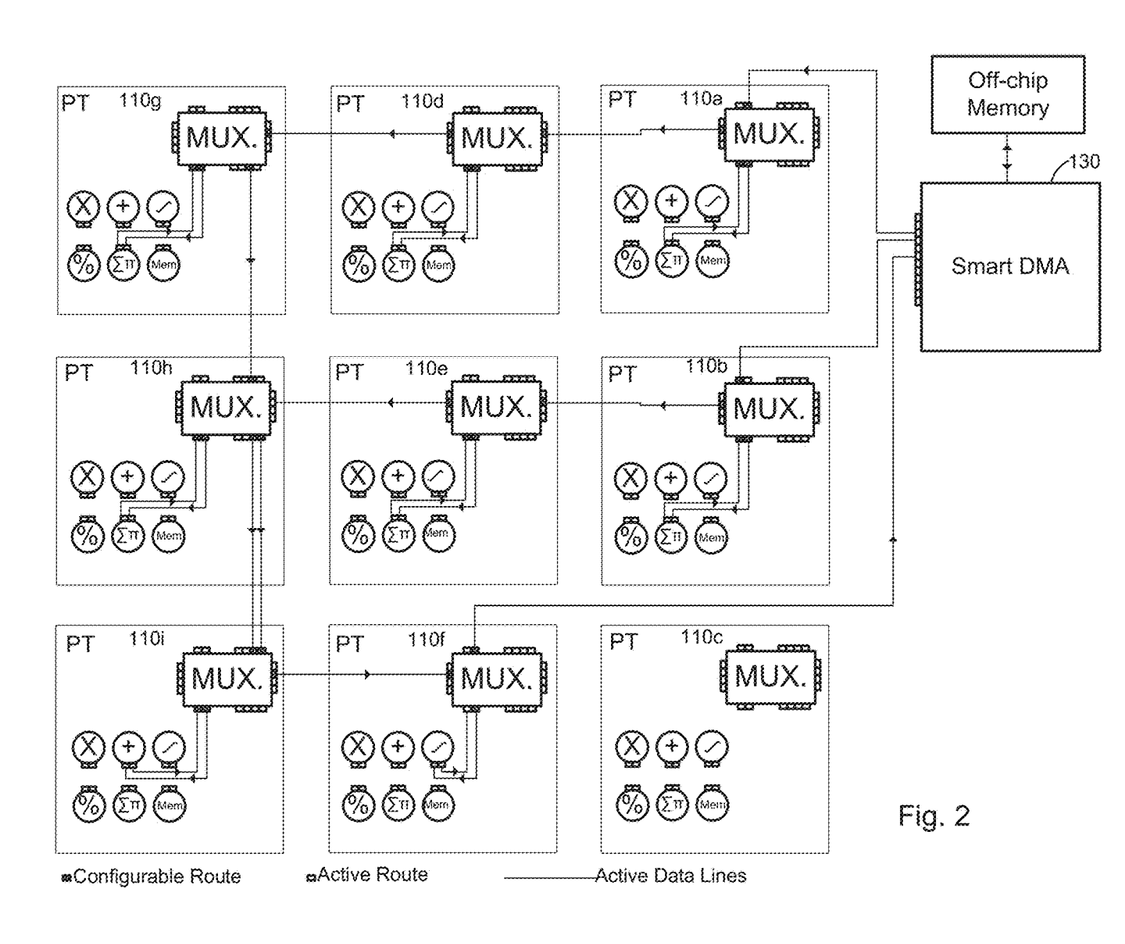
FIG. 2 illustrates configured processing tiles in a dataflow processor in accordance with an illustrative embodiment.

FIG. 2 illustrates configured processing tiles in a dataflow processor in accordance with an illustrative embodiment. FIG. 2 illustrates the configured paths for a particular configuration of the dataflow processor. Data from the memory access module 130 is sent to two processing tiles 110*a* and 110*b* and, an operation is performed on the data in each of the two processing tiles 110*a* and 110*b*. In one embodiment, data from the multi-port memory access module can be sent to two or more processing tiles simultaneously. The operations performed in processing tiles 110*a* and 110*b* are done in parallel to one another and, the results are sent to processing tiles 110*d* and 110*e*, respectively. Operations can also be pipelined. For instance, processing tiles 110*a*, 110*d*, and 110*g* form a pipeline, such that, the operations of processing tiles 110*a*, 110*d* and 110*g* can be performed in parallel to one another. Accordingly, multiple data streams can be processed in parallel to one another and also in a pipeline fashion. Data continues in parallel through various processing tiles 110*d*, 110*e*, 110*g*, and 110*h*. Each processing tile has the ability to stall or do nothing during a particular clock cycle. For example, data can be received by the processing tiles 110*g* and 110*h* at the same time. Once received the configured operation of each processing tile is performed on the received data. The data from the processing tile 110*g* can then be sent to the processing tile 110*h*. During this transfer, the data from the configured operation of processing tile 110*h* is stalled waiting for the data from processing tile 110*g* to be received. Once the data from processing tile 110*g* is received, this data along with the data from the configured operation of processing tile 110*h* can be sent to processing tile 110*i*.

The two data streams are eventually received by the processing tile 110*i* and a selected operation, in this example a summation, is performed on the data. The result of this operation is sent to processing tile 110*f*, where another operation is performed on the data, and the result is sent back to the memory access module 130. As illustrated in FIG. 2, once the dataflow processor is configured, data that enters the dataflow processor ripples through various processing tiles. As the data streams flow through the dataflow processor, various operations can be performed on the data streams. Once data enters the data flow processor, a number of operations can be performed on the data without requiring external memory access. The number of external memory accesses, therefore, can be greatly reduced compared to general CPUs or GPUs. Reducing the number of external memory accesses can significantly reduce the power consumption of the dataflow processor compared to a general CPU or GPU.

Not all of the processing tiles in a dataflow processor need to be configured for a particular configuration. For example, processing tile 110*c* of FIG. 2 is not needed for the particular illustrated example and, therefore, is not connected to another processing tile or the memory access module 130.

The global data lines, local data lines, and controller are still present in the dataflow processor, but are not illustrated in FIG. 2. The processing tiles 110 are configured to compute a sum of two convolutions followed by a non-linear activation function:

$$y_{1,i,j} = \mathrm{Tanh}\left(\sum_{m=0}^{K-1}\sum_{n=0}^{K-1} x_{1,i+m,j+n} w_{1,m,n} + \sum_{m=0}^{K-1}\sum_{n=0}^{K-1} x_{2,i+m,j+n} w_{2,m,n}\right). \quad (1)$$

The operator $\Sigma\Pi$ performs a sum of products or a dot-product between an incoming stream and a local set of weights (preloaded as a stream). Therefore, each tile performs a 1D convolution, and three tiles are used to compute a 2D convolution with a 3×3 kernel. In FIG. 2 all the paths are simplified, and, in some cases, one line represents multiple parallel streams.

Figure 3:
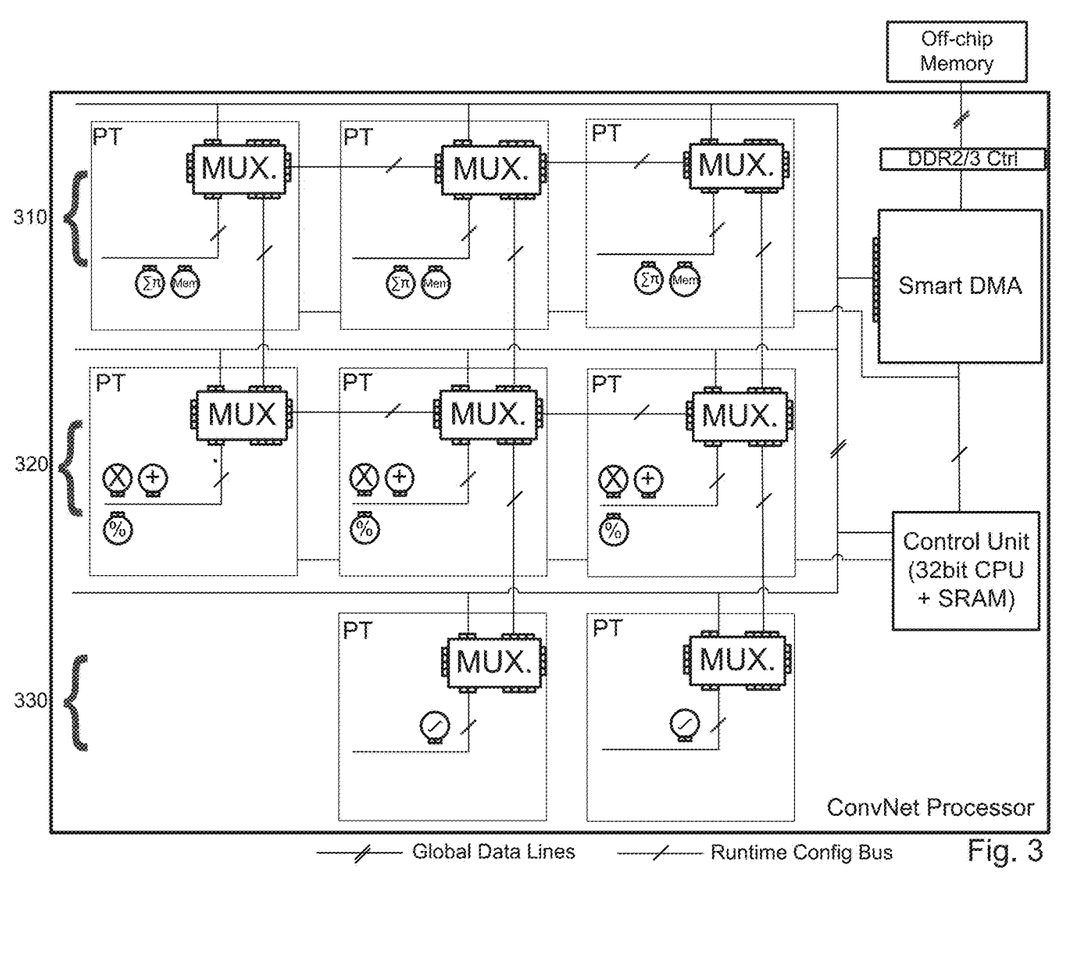
FIG. 3 illustrates configured processing tiles in a dataflow processor in accordance with an illustrative embodiment.

Recent DSP-oriented FPGAs include a large number of hard-wired MAC units and several thousand programmable cells (lookup tables), which allow fast prototyping and real-time simulation of circuits, but also actual implementations to be used in final products. FIG. 3 illustrates configured processing tiles in a dataflow processor in accordance with an illustrative embodiment. The configurations of the processing tiles can be coded in hardware description languages (HDL) to target both ASIC synthesis and programmable hardware like FPGAs.

In the embodiment of FIG. 3, the illustrated processing tiles are independent processing tiles laid out on a two-dimensional grid. Each processing tile contains a routing multiplexer (MUX) and local operators. Compared to the general purpose architecture illustrated in FIG. 1, this implementation is specialized for applications that rely heavily on two-dimensional convolutions (for convolutional networks, 80% to 90% of the computations are spent in filtering). FIG.

3 shows this specialization. The top row of processing tiles 310 only implement Multiply and Accumulate (MAC) arrays (ΣΠ operators), which can be used as 2D convolvers (implemented in the FPGA by dedicated hardwired MACs). It can also perform on-the-fly subsampling (spatial pooling) and simple dot products (linear classifiers). The middle row of processing tiles 320 contains general purpose operators, such as squaring and dividing for divisive normalization, and other mathematical operators. The bottom row processing tiles 330 implement non-linear mapping engines, used to compute all sorts of functions from Tanh( ) to Sqrt( ) or Abs( ). Those can be used at various places, from normalization to non-linear activation units.

In one embodiment, the operators in the processing tiles 110 are fully pipelined to produce one result per clock cycle. Image pixels are stored in off-chip memory as Q8.8 (16 bit, fixed-point), transported on global lines as Q8.8 and scaled to 32-bit integers within operators, to keep full precision between successive operations. The numeric precision, and hence the size of a pixel, will be noted $P_{bits}$.

The 2D convolver can be viewed as a dataflow grid itself, with the only difference that the connections between the operators (the MACs) are fixed. The reason for having a 2D convolver within a tile (instead of a 1D convolver per tile, or even simply one MAC per tile) is that it maximizes the ratio between computing logic and routing logic. This is less flexible, as the choice of the array size is a hardwired parameter, but it is a reasonable choice for an FPGA implementation, and for image processing in general. In another embodiment, such as for an ASIC implementation, a 1D dot product operator per tile can be used.

Both the kernel and the image are streams loaded from the memory, and the filter kernels can be pre-loaded in local caches concurrently to another operation. Each pixel streaming in the convolver triggers K×K parallel operations, when applying K×K filters.

All the non-linearities in neural networks can be computed with the use of look-up tables or piece-wise linear decompositions. A look-up table associates one output value for each input value and, therefore, requires as much memory as the range of possible inputs. This is one of the fastest methods to compute a non-linear mapping, but the time required to reload a new table is prohibitive if different mappings are to be computed with the same hardware.

A piece-wise linear decomposition is not as accurate (f is approximated by g, as in equation 2), but only requires a couple of coefficients $a_i$ to represent a simple mapping such as a hyperbolic tangent, or a square root. It can be reprogrammed very quickly at runtime, allowing multiple mappings to reuse the same hardware. Moreover, if the coefficients $a_i$ follow the constraint given by equation 3, the hardware can be reduced to shifters and adders only.

$$g(x) = a_i x + b \text{ for } x \in [l_i, l_{i+1}] \quad (2)$$

$$a_i = \frac{1}{2^m} + \frac{1}{2^n} \; m, n \in [0, 5] \quad (3)$$

The memory access module is an important part of the dataflow processor. The memory access module allows $N_{DMA}$ ports to access external memory totally asynchronously. In one embodiment, a dedicated arbiter is used as an interface to multiplex and demultiplex access to the external memory with high bandwidth. Subsequent buffers on each port insure continuity of service on a port while the others are utilized.

The memory access module complements the control unit. Each port of the DMA can be configured to read or write a particular chunk of data, with an optional stride (for 2D streams), and communicate its status to the control unit. Although this might seem trivial, it respects one of the foundations of dataflow computing: while the control unit configures the processing tiles, the connections between the processing tiles and the memory access unit, and the memory ports, such as direct memory access ports, for each operation, an operation is driven exclusively by the data, from its fetching, to its writing back to off-chip memory.

If the processing tiles are synchronous to the memory bus clock, the following relationship can be established between the memory bandwidth $B_{EXT}$, the number of possible parallel data transfers MAX($N_{DMA}$) and the bits per pixel $P_{bits}$:

$$\text{MAX}(N_{DMA}) = \frac{B_{EXT}}{P_{bits}}. \quad (4)$$

For example $P_{bits}$=16 and $B_{EXT}$=128 bit/cyc allows MAX ($N_{DMA}$)=7 simultaneous transfers.

Prior to being run on the dataflow processor, a given algorithm has to be converted to a representation that can be interpreted by the control unit to generate controls/configurations for the system. For that purpose a compiler and dataflow API can be used. In one embodiment, a compiler can take sequential, tree-like or flow-graph descriptions of algorithms and parse them to extract different levels of parallelism. Pattern matching can be used to map known sequences of operations to low-level, pre-optimized routines. Other unknown operators are mapped in less optimized ways. Once each high-level module has been associated with a set of low-level operations, a static sequence of grid configurations, interspersed with memory transfers, is produced, and dumped as binary code for the embedded control unit.

To generate code for the control unit, the compiler can determine how to schedule dataflow computations, and how to represent streams and computations on streams. The problem can be formulated simply: given a particular graph-type description of an algorithm and given a particular implementation of the dataflow grid, what is the sequence of grid configurations that yields the shortest computation time?

There are three levels at which computations can be parallelized:

across modules: operators can be cascaded, and multiple modules can be computed on the fly (average speedup),
  across images, within a module: can be done if multiple instances of the required operator exist (poor speedup, as each independent operation requires its own input/output streams, which are limited by the bandwidth to external memory $B_{EXT}$),
  within an image: some operators naturally implement that (the 2D convolver, which performs all the MACs in parallel), in some cases, multiple tiles can be used to parallelize computations.

Parallelizing computations across modules can be done in special cases. For example, linear operations (convolutions) are often followed by non-linear mappings in neural networks: these two operators (each belonging to a separate module) can be easily cascaded on the grid. This simple optimization speeds up the computation by a factor of two.

Parallelizing computations across images is straightforward, and can be done massively on a configured dataflow processor. A non-limiting example illustrates that point: given a dataflow grid built with 4 processing tiles with 2D convolvers, 4 processing tiles with standard operators, and 4 processing tiles with non-linear mappers, we want to compute a fully-connected filter-bank with 4 inputs and 8 outputs, e.g. a filer bank where each of the 8 outputs is a sum of 4 inputs, each convolved with a different kernel:

$$y_j = \sum_{i=0}^{3} k_{ij} * x_i \text{ for } j \in [0, 7]. \quad (5)$$

For the given hardware, the optimal mapping is: each of the four 2D convolvers is configured to convolve one of the three inputs $x_i$ a kernel $k_{ij}$, and a standard processing tile is configured to accumulate those 4 streams into one and produce $y_j$.

Parallelizing computations within images is what this grid is best at: this is the simplest form of parallelism, where locality in memory is exploited to the maximum.

EXAMPLES

The present dataflow processor and methods will be understood more readily by reference to the following example, which is provided by way of illustration and is not intended to be limiting in any way.

Example 1

Street Scene Parser

Figure 5:
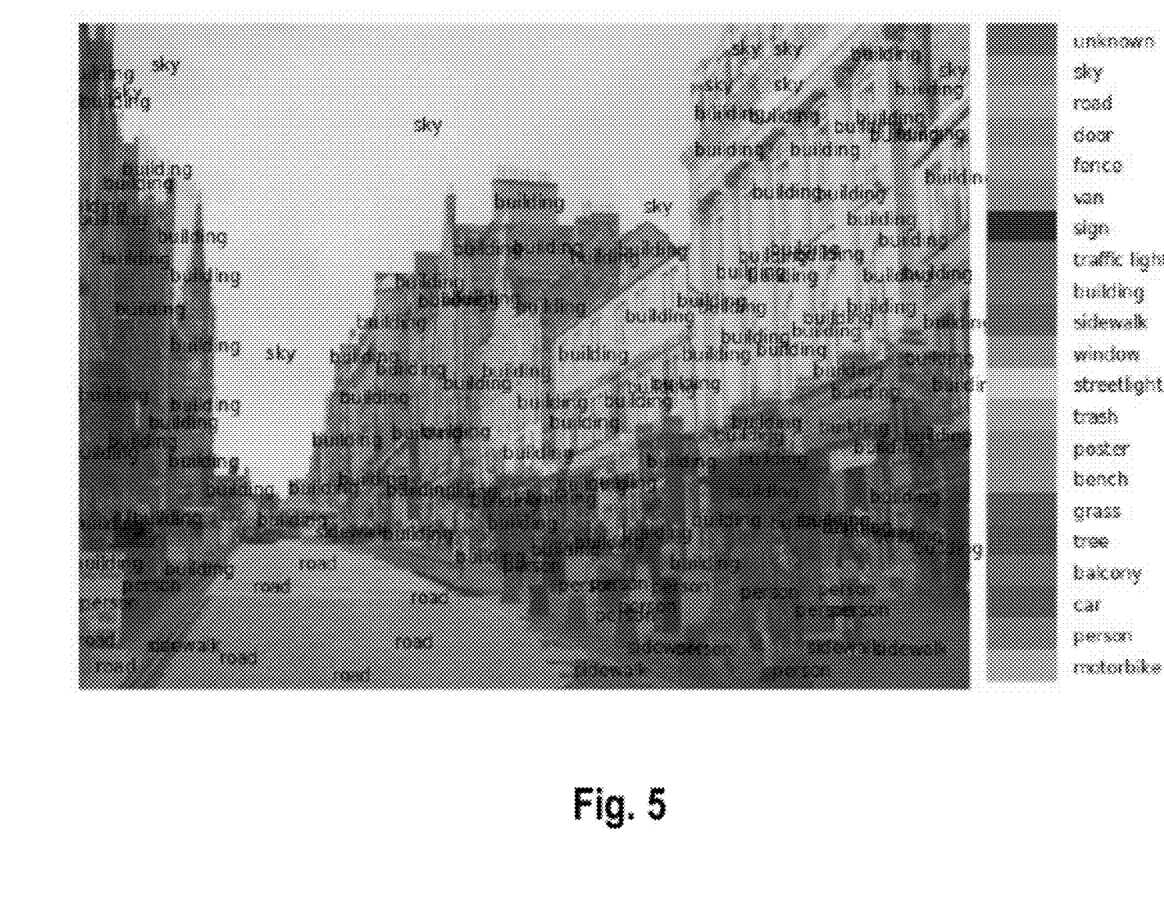
FIG. 5 illustrates output of a convolutional network for image processing that can be implemented on a dataflow processor in accordance with an illustrative embodiment.

Various visual processing algorithms can be implemented on the dataflow processor. For instance, face detectors, pixel-wise obstacle classifiers, and street scene parses can be implemented on a dataflow processor. FIG. 5 illustrates output of a convolutional network for image processing that can be implemented on a dataflow processor in accordance with an illustrative embodiment. Specifically, FIG. 5 illustrates the output of a street scene processor.

Scene parsing aims at segmenting and recognizing the content of a scene: from objects to large structures—roads, sky, buildings, cars, etc. In other words, the goal is to map each pixel of a given input image to a unique label.

D. Grangier et al, Deep convolutional networks for scene parsing showed that using a deep convolutional network with a greedy layer-wise learning (up to 6 convolutional layers) could yield significantly better results than simpler 2 or 3-layer systems. The ideas from this paper were modified by using a slightly different method, favoring larger kernels over deeper networks, but kept the idea of incrementally growing the network's capacity.

A subset of a collection of images, containing about 3000 images of Spanish cities, was used to train this convolutional network. 10% of the set was removed to be used for validation (testing). The twenty most-occurring classes were extracted, and the goal was set to minimize the pixel classification error on those classes.

All the images were first resized to 500×375, then 400 million patches were randomly sampled to produce a 20×1e8×N×N tensor where the first dimension indexes the classes, the second indexes patches of which the center pixel belongs to the corresponding class, and the last two dimensions are the height and width of the patch.

The training was done in 3 phases. First: we started with a simple model, $CN_1$ (table 1). The model has small kernels (5×5) and 3 convolutional layers only. This first model was trained to optimize the pixel-wise cross entropy (negative log-likelihood) through stochastic gradient descent over the training set. Minimizing the cross entropy (rather than the mean-square error) helps promote the categories of rare appearance. Small kernels, and a few layers allowed the system to see 10 million training patches in a couple of hours, and converge to a reasonable error fairly quickly. With these parameters, the receptive field of the network is 32×32, which only represents 0.55% of the complete field of view;

TABLE 1

$CN_1$: base model.

| Layer | Kernels: dims [nb] | Maps: dims [nb] |
| --- | --- | --- |
| Input image | | 32 × 32 [3] |
| N0 (Norm) | | 32 × 32 [3] |
| C1 (Conv) | 5 × 5 [48] | 28 × 28 [12] |
| P2 (Pool) | 2 × 2 [1] | 14 × 14 [12] |
| C3 (Conv) | 5 × 5 [384] | 10 × 10 [32] |
| P4 (Pool) | 2 × 2 [1] | 5 × 5 [32] |
| C5 (Conv) | 5 × 5 [1536] | 1 × 1 [48] |
| L (Linear) | 1 × 1 [960] | 1 × 1 [20] |

N: Local Normalization layer (note: only the Y channel is normalized, U and V are untouched);
C: convolutional layer;
P: pooling (max) layer;
L: Linear classifier.

Second: all the convolutional kernels were then increased to 9×9, by padding the extra weights with zeros: CN2 (table 2). This increased the receptive field to 60×60 (about 2% of the image), with the interesting property that at time 0 of this second training phase, the network was producing the same predictions as with the smaller kernels;

TABLE 2

$CN_2$: second model.
Filters are increased, which doubles the receptive field

| Layer | Kernels: dims [nb] | Maps: dims [nb] |
| --- | --- | --- |
| Input image | | 60 × 60 [3] |
| N0 (Norm) | | 60 × 60 [3] |
| C1 (Conv) | 9 × 9 [48] | 52 × 52 [12] |
| P2 (Pool) | 2 × 2 [1] | 26 × 26 [12] |
| C3 (Conv) | 9 × 9 [384] | 18 × 18 [32] |
| P4 (Pool) | 2 × 2 [1] | 9 × 9 [32] |
| C5 (Conv) | 9 × 9 [1536] | 1 × 1 [48] |
| L (Linear) | 1 × 1 [960] | 1 × 1 [20] |

Third: a fourth layer was added—a.k.a. greedy layerwise learning—which increased the receptive field to 92×92 (5% of the image). This required dropping the previous linear classifier, and replacing it with a new—randomly-initialized—larger classifier (table 3). Performances were evaluated on a separate test set, which was created using a subset (10%) of the original dataset. Results are shown on Table 4.

TABLE 3

$CN_3$: a fourth convolutional layer C6 is added, which, again, increases the receptive field.

| Layer | Kernels: dims [nb] | Maps: dims [nb] |
| --- | --- | --- |
| Input image | | 60 × 60 [3] |
| N0 (Norm) | | 60 × 60 [3] |
| C1 (Conv) | 9 × 9 [48] | 52 × 52 [12] |
| P2 (Pool) | 2 × 2 [1] | 26 × 26 [12] |

TABLE 3-continued

CN$_3$: a fourth convolutional layer C6 is added, which, again, increases the receptive field.

| Layer | Kernels: dims [nb] | Maps: dims [nb] |
|---|---|---|
| C3 (Conv) | 9 × 9 [384] | 18 × 18 [32] |
| P4 (Pool) | 2 × 2 [1] | 9 × 9 [32] |
| C5 (Conv) | 9 × 9 [1536] | 1 × 1 [48] |
| C6 (Conv) | 9 × 9 [1024] | 1 × 1 [128] |
| L (Linear) | 1 × 1 [960] | 1 × 1 [20] |

Note:
C6 has sparse connectivity (e.g. each of its 128 outputs is connected to 8 inputs only, yielding 1024 kernels instead of 6144).

TABLE 4

Percentage of mislabeled pixels on validation set.

| | Model | | |
|---|---|---|---|
| | CN$_1$ | CN$_2$ | CN$_3$ |
| CN Error (%) | 29.75% | 26.13% | 24.26% |
| CN + MST Error (%) | 27.17% | 24.40% | 23.39% |

CN Error is the pixelwise error obtained when using the simplest pixelwise winner, predicted by the convolutional network.
CN + MST Error is the pixelwise error obtained by histogramming the convolutional network's prediction into connected components (the components are obtained by computing the minimum spanning tree of an edge-weighted graph built on the raw RGB image, and merging its nodes using a surface criterion.)

Once trained, the network was passed over to a compiler, which output binary code for the control unit. A key advantage of convolutional networks is that they can be applied to sliding windows on a large image at very low cost by simply computing convolutions at each layer over the entire image. The output layer is replicated accordingly, producing one detection score for every 92×92 window on the input, spaced every 4 pixels. The overall network is depicted in Figure for a 500×375 input image. Producing the prediction on one image of that size takes about 8 seconds on a laptop-class Intel DuoCore 2.66 GHz processor; the same prediction is produced in 83 ms on an illustrative dataflow processor, with an average error of $10^{-2}$ (quantization noise).

Table 5 reports a performance comparison for the computation of a typical filter bank operation on multiple platforms: 1—the CPU data was measured from compiled C code (GNU C compiler and Blas libraries) on a Core 2 Duo 2.66 GHz Apple Macbook PRO laptop operating at 90 W (30 W for the CPU); 2—the FPGA data was measured on a Xilinx Virtex-6 VLX240T operating at 200 MHz and 10 W (power consumption was measured on the board); 3—the GPU data was obtained from a CUDA-based implementation running on a laptop-range nVidia GT335m operating at 1 GHz and 30 W and on a nVidia GTX480 operating at 1 GHz and 220 W; 4—the ASIC data is simulation data gathered from an IBM 45 nm CMOS process (5×5 mm). For an ASIC-based design with a speed of 400 MHz, the projected power consumption, using post-synthesis data and standard analysis tools, is estimated at 5 W.

TABLE 5

Performance comparison.

| | CPU | V6 | mGPU | IBM | GPU |
|---|---|---|---|---|---|
| Peak GOPs | 10 | 160 | 182 | 1280 | 1350 |
| Real GOPs | 1.1 | 147 | 54 | 1164 | 294 |
| Power W | 30 | 10 | 30 | 5 | 220 |
| GOPs/W | 0.04 | 14.7 | 1.8 | 230 | 1.34 |

1 - CPU: Intel DuoCore, 2.7 GHz, optimized C code,
2 - V6: illustrative dataflow processor on Xilinx Virtex 6 FPGA - on board power and GOPs measurements;
3 - IBM: illustrative dataflow processor on IBM 45 nm process: simulated results, the design was fully placed and routed;
4 - mGPU/GPU: two GPU implementations, a low power nVidia GT335m and a high-end nVidia GTX480.

The current design was proven at 200 MHz on a Xilinx Virtex 6 ML605 platform, using four 10×10 convolver grids. At this frequency, the peak performance is 80 billion connections per second, or 160 GMACs. Sustained performances for typical applications (such as the street scene parser) range from 60 to 120 GMACs, sustained.

One or more flow diagrams have been used herein. The use of flow diagrams is not meant to be limiting with respect to the order of operations performed. The herein-described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A processor comprising:
   a plurality of processing tiles, wherein each processing tile is configured at runtime to perform a configurable operation, wherein a first subset of processing tiles are configured to perform in a pipeline a first plurality of configurable operations in parallel, and wherein a second subset of processing tiles are configured to perform a second plurality of configurable operations in parallel, wherein each of the plurality of processing tiles comprise:
   a multiplexer configured to:
      receive input data from the multi-port memory access module and from another processing tile, wherein at least one of the processing tiles receives data from the multi-port memory access module;
      send output data to the multi-port memory access module and to another processing tile, wherein at least one of the processing tiles sends data to the multi-port memory access module; and
   a plurality of operators each operably connected to the multiplexer, wherein each operator is configured to:
      receive the input data from the multiplexer;
      perform an operation on the input data to generate the output data; and
      send the output data to the multiplexer;
   a first in, first out (FIFO) buffer operably connected to each of the input and output of each respective plurality of operators, wherein each of the plurality of operators is configured to stall when one of the respective FIFO buffers operably connected to the respective operator is full;
   a multi-port memory access module operably connected to the plurality of processing tiles via data lines, wherein the multi-port memory access module is configured to:
      control access to a shared memory;
      provide data to two or more processing tiles simultaneously; and
      give the plurality of processing tiles direct access to the shared memory; and
   at least one controller operably connected to the plurality of processing tiles and the multi-port memory access module via a runtime bus, wherein the at least one controller is adapted to configure the plurality of processing tiles and the multi-port memory access module to execute a computation.

2. The processor of claim 1, wherein only a single operator of the plurality of operators is active.

3. The processor of claim 1, wherein the controller is configured to activate one of the plurality of operators for one or more of the plurality of processing tiles.

4. The processor of claim 1, wherein the controller is configured to send a configuration packet to one or more of the plurality of processing tiles, wherein the one or more of the plurality of the processing tiles are configured to activate an operator based upon the configuration packet.

5. The processor of claim 1, wherein the controller is configured to send a configuration packet to the multi-port memory access module, and wherein the multi-port memory access module is configured to connect one or more ports to one or more of the plurality of the processing tiles.

6. The processor of claim 1, wherein one or more of the plurality of the processing tiles are configured to connect to another processing tile.

7. The processor of claim 6, wherein the controller is configured to reconfigure the connections between the one or more of the plurality of the processing tiles.

8. The processor of claim 1, wherein one or more of the plurality of the processing tiles are configured to connect to the multi-port memory access module.

9. The processor of claim 8, wherein the controller is configured to reconfigure the connections between the one or more of the plurality of the processing tiles and the multi-port memory access module.

10. The processor of claim 1, wherein the controller is configured to configure the plurality of processing tiles and the multi-port memory access module to perform two or more convolutions.

11. The processor of claim 10, wherein the controller is configured to configure the plurality of processing tiles and the multi-port memory access module to perform the two or more convolutions in parallel with one another.

12. The processor of claim 10, wherein the controller is further configured to configure the plurality of processing tiles and the multi-port memory access module to sum the two or more convolutions.

13. The processor of claim 12, wherein the controller is further configured to configure the plurality of processing tiles and the multi-port memory access module to perform an operation on the sum of the two or more convolutions.

14. The processor of claim 1, wherein the controller is configured to configure a subset of the plurality of processing tiles.

15. The processor of claim 1, wherein each of the plurality of processing tiles is uniquely addressable.

16. A method comprising:
sending, from a controller, a first configuration packet to a first plurality of processing tiles;
receiving, at the first plurality of processing tiles, the first configuration packet;
selecting, at each of the first plurality of processing tiles, an operation to execute a sum of products to implement a multiply and accumulate array based upon the received first configuration packet, the selection at each of the first plurality of processing tiles configuring a first pipeline comprising the first plurality of processing tiles;
sending, from the controller, a second configuration packet to a second plurality of processing tiles;
receiving, at the second plurality of processing tiles, the second configuration packet;
selecting, at each of the second plurality of processing tiles, a standard operator to execute based upon the received second configuration packet, the selection at each of the second plurality of processing tiles configuring a second pipeline comprising the second plurality of processing tiles;
sending, from the controller, a third configuration packet to a multi-port memory access module;
connecting one of the first plurality of processing tiles and one of the second plurality of processing tiles to the multi-port memory access module based upon the third configuration packet, wherein each of the first plurality and the second plurality of processing tiles are configurable to connect to another processing tile as well as the multi-port memory access module;
receiving first data at the first plurality of processing tiles comprising a kernel for each of the first plurality of processing tiles from the multi-port memory access module and second data;
executing each operation to execute the sum of products to implement the multiply and accumulate array at each of the first plurality of processing tiles using the respective kernel on the respective second data to generate a respective first output data; and
executing the standard operator at each of the second plurality of processing tiles on at least a portion of each respective first output data of the first plurality of processing tiles to generate a respective second output data.

17. The method of claim 16, further comprising connecting one of the second plurality of processing tiles to an additional processing tile based upon one of the configuration packets.

18. The method of claim 16, further comprising:
sending at least one of the respective second output data to an additional processing tile; and
executing a non-linear operation on the received at least one of the second output data to generate third output data.

19. The method of claim 18, further comprising sending the third output data to the multi-port memory access module.

20. The method of claim 18, further comprising sending the third output data to another processing tile.

21. The method of claim 16, wherein each of the one or more of processing tiles is uniquely addressable.

22. The method of claim 16, further comprising:
sending, from the controller, a fourth configuration packet to an additional processing tile; and
connecting the additional processing tile to one of the first plurality of processing tiles and to one of the second plurality of processing tiles and to the multi-port memory access module based upon the fourth configuration packet.

23. A processor comprising:
a first plurality of processing tiles configured to perform in a pipeline a first plurality of configurable operations in parallel, and a second plurality of processing tiles configured to perform in a pipeline a second plurality of configurable operations in parallel, wherein each of the first plurality of processing tiles comprise:
a multiplexer configured to:
receive first respective input data from the multi-port memory access module comprising a respective kernel and respective first data; and
send respective first output data to at least one of the second plurality of processing tiles, and
an operator operably connected to the multiplexer configured to:
receive the first respective input data from the multiplexer; and
execute an operation to execute the sum of products to implement a multiply and accumulate array using the respective kernel and the respective first data to generate the first respective output data;
and wherein each of the second plurality of processing tiles comprise:
a multiplexer configured to:
receive second respective input data from at least one of the first plurality of processing tiles comprising at least a portion of the first respective output data; and
send respective second output data to at least one of the multi-port memory access module and an additional processing tile, and
an operator operably connected to the multiplexer configured to:
receive the second respective input data from the multiplexer; and
execute an operation comprising a standard operator on at least a portion of the second respective input data to generate the second output data;
the processor further comprising:
a multi-port memory access module operably connected to a plurality of the first plurality of processing tiles and the second plurality of processing tiles via data lines, wherein the multi-port memory access module is configured to:
control access to a shared memory;
provide data to two or more processing tiles simultaneously; and
give the plurality of the first plurality of processing tiles and the second plurality of processing tiles direct access to the shared memory.

24. The processor of claim 23, wherein the respective multiplexer of at least one of the second plurality of processing tiles is configured to send the respective second output data to the additional processing tile, the additional processing tile configured to execute a non-linear operation on the received respective second output data to generate third output data.

* * * * *